(12) United States Patent
Hudson

(10) Patent No.: US 12,261,953 B2
(45) Date of Patent: Mar. 25, 2025

(54) SMART MILITARY COMMUNICATION SYSTEM AND METHOD

(71) Applicant: PARRY LABS LLC, Alexandria, VA (US)

(72) Inventor: Justin Nathaniel Hudson, Alexandria, VA (US)

(73) Assignee: PARRY LABS LLC, Alexandria, VA (US)

( * ) Notice: Subject to any disclaimer, the term of this patent is extended or adjusted under 35 U.S.C. 154(b) by 256 days.

(21) Appl. No.: 18/097,223

(22) Filed: Jan. 14, 2023

(65) Prior Publication Data

US 2024/0243911 A1    Jul. 18, 2024

(51) Int. Cl.
| | |
|---|---|
| H04L 29/00 | (2006.01) |
| H04L 9/00 | (2022.01) |
| H04L 9/08 | (2006.01) |
| H04L 9/32 | (2006.01) |

(52) U.S. Cl.
CPC ............ *H04L 9/088* (2013.01); *H04L 9/3239* (2013.01); *H04L 9/50* (2022.05)

(58) Field of Classification Search
CPC .......... H04L 9/088; H04L 9/3239; H04L 9/50
See application file for complete search history.

(56) References Cited

U.S. PATENT DOCUMENTS

| | | | | |
|---|---|---|---|---|
| 6,507,802 B1 * | 1/2003 | Payton | ................... | G06Q 99/00 706/11 |
| 6,606,627 B1 * | 8/2003 | Guthrie | ............. | G06F 16/24547 707/999.005 |
| 7,681,036 B1 * | 3/2010 | Zuber | ................... | H04L 9/0827 713/166 |
| 9,191,163 B2 * | 11/2015 | Liu | ........................ | H04L 1/1893 |
| 9,602,625 B2 * | 3/2017 | Russell | ................... | H04L 67/60 |
| 9,608,810 B1 * | 3/2017 | Ghetti | ................. | H04L 63/0428 |
| 9,621,343 B1 * | 4/2017 | Ghetti | ..................... | H04L 9/083 |
| 9,894,485 B2 * | 2/2018 | Finlow-Bates | ....... | H04W 12/06 |

(Continued)

OTHER PUBLICATIONS

Mohamed, R. ., Abas, H., & Mohd. Yusof, F. (2022). Blockchain Resilient Communication in Military: A Systematic Literature Review. Open International Journal of Informatics, 10(Special Issue 1), 51-62. https://doi.org/10.11113/oiji2022.10nSpecial Issue 1.181 (Year: 2022).*

*Primary Examiner* — Don G Zhao
(74) *Attorney, Agent, or Firm* — Von Rohrscheidt Patents

(57) ABSTRACT

A smart communication system including a stream processor, a plurality of inputs that are time stamped with times from a chip scaled atomic clock, and a plurality of functional blocks implemented in non-transitory computer-readable mediums. The plurality of functional blocks include an encrypted private distributed ledger block, a fusion engine block, a hashing block, and a predictive analytics block. The plurality of inputs are hashed by the hashing block to produce hashed inputs and the hashed inputs are posted into the encrypted private distributed ledger block as a hash table. The predictive analytics block processes the hash table based upon a predetermined criteria for a particular user or based upon a predictive analytics determined criteria of the particular user to produce a data subset for the particular user. The fusion engine block organizes the data subset for the particular user into an organized data subset.

20 Claims, 1 Drawing Sheet

(56) References Cited

U.S. PATENT DOCUMENTS

| | | | | |
|---|---|---|---|---|
| 11,005,828 | B1* | 5/2021 | Kapp | G06F 21/64 |
| 11,257,098 | B2* | 2/2022 | Bakalis | H04L 9/3213 |
| 11,836,743 | B2* | 12/2023 | Bakalis | G06Q 30/0185 |
| 2003/0134655 | A1* | 7/2003 | Chen | H04L 9/40 |
| | | | | 455/13.1 |
| 2014/0108800 | A1* | 4/2014 | Lawrence | H04L 63/123 |
| | | | | 713/168 |
| 2017/0302440 | A1* | 10/2017 | Agrawal | H04L 9/3239 |
| 2018/0205536 | A1* | 7/2018 | Tomlinson | H04L 9/0662 |
| 2019/0141757 | A1* | 5/2019 | Väänänen | G06N 3/08 |
| 2019/0303951 | A1* | 10/2019 | Bakalis | H04L 9/30 |
| 2019/0363881 | A1* | 11/2019 | Bakalis | G06Q 30/0185 |
| 2020/0084045 | A1* | 3/2020 | Cohen | H04L 9/14 |
| 2021/0014060 | A1* | 1/2021 | Georgiadis | G06Q 20/3829 |
| 2021/0306861 | A1* | 9/2021 | Elmasry | H04W 88/16 |
| 2022/0129438 | A1* | 4/2022 | Baird, III | G06F 16/27 |
| 2022/0166601 | A1* | 5/2022 | Farooq | H04L 9/0631 |
| 2022/0277317 | A1* | 9/2022 | Bakalis | H04L 9/3239 |
| 2022/0286845 | A1* | 9/2022 | Vanoss | H04L 63/0876 |
| 2022/0358236 | A1* | 11/2022 | Taylor | H04L 9/0618 |
| 2023/0091179 | A1* | 3/2023 | Bari | H04L 9/3236 |
| | | | | 713/168 |
| 2023/0176557 | A1* | 6/2023 | Cella | G05B 23/024 |
| | | | | 700/117 |
| 2024/0048369 | A1* | 2/2024 | Kam | H04L 9/3093 |
| 2024/0076056 | A1* | 3/2024 | Roper, Jr. | H04L 63/1416 |
| 2024/0243911 | A1* | 7/2024 | Hudson | H04L 9/088 |
| 2024/0296464 | A1* | 9/2024 | Bakalis | H04L 9/0827 |

* cited by examiner

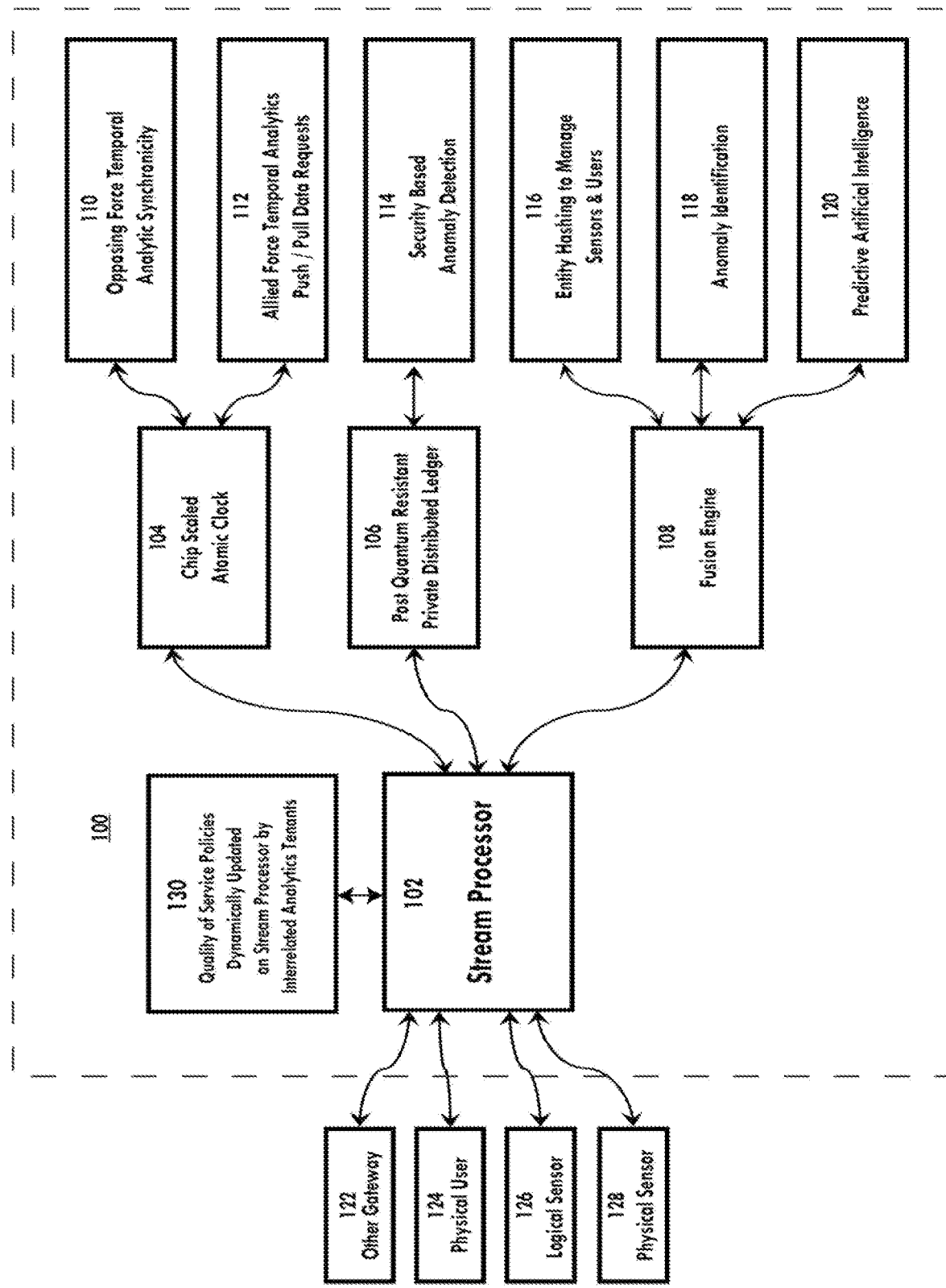

SMART MILITARY COMMUNICATION SYSTEM AND METHOD

FIELD OF THE INVENTION

The present invention relates generally to a smart communication system, and more particularly, to a smart military communication system that adjusts dynamically to the dangers of the battlefield.

BACKGROUND

Efficient and secure battlefield communications have been important in warfare since the advent of warfare. That is especially true today because the modern battlefield interconnects pretty much everything and it is this interconnection that enhances lethality and survivability. Thus, success on the battlefield (e.g., life or death) is dependent upon having efficient and secure battlefield communications. More efficient and secure battlefield communications help ensure greater lethality and better survivability. Accordingly, there is a strong and continuing need to improve battlefield communications.

SUMMARY OF THE INVENTION

An aspect of the present invention is to provide a smart communication system including a stream processor, a plurality of inputs that are time stamped with times from a chip scaled atomic clock, and a plurality of functional blocks implemented in non-transitory computer-readable mediums. The plurality of functional blocks implemented in non-transitory computer-readable mediums including an encrypted private distributed ledger block, a fusion engine block, a hashing block, and a predictive analytics block. The plurality of inputs are hashed by the hashing block to produce hashed inputs and the hashed inputs are posted into the encrypted private distributed ledger block as a hash table. The predictive analytics block processes the hash table based upon a predetermined criteria for a particular user or based upon a predictive analytics determined criteria of the particular user to produce a data subset for the particular user, and the fusion engine block organizes the data subset for the particular user into an organized data subset.

The predetermined criteria for the particular user may be derived from mission parameters. The predictive analytics determined criteria of the particular user may be derived from historical usage of the particular user. The fusion engine block may organize the data subset for the particular user by excluding redundant or stale data. The fusion engine block may organize the data subset for the particular user by prioritizing data based upon the predetermined criteria for the particular user or based upon the predictive analytics determined criteria of the particular user. The fusion engine block may locate the organized data subset in a communication network based upon the predetermined criteria for the particular user or based upon the predictive analytics determined criteria of the particular user such that a delivery time is minimized for the particular user when the organized data subset is requested by the particular user. The fusion engine block may locate the organized data subset on a system used by the particular user without a request from the particular user. The encrypted private distributed ledger block may be a post quantum resistant encrypted private distributed ledger block. The plurality of functional blocks implemented in non-transitory computer-readable mediums may further include one or more of an opposing force temporal analytics synchronicity block, an allied force temporal analytic pull/push requests block, a security based anomaly detections block, and/or an anomaly identifications block. The plurality of inputs may be from one or more users, logical sensors, other communication systems, and physical sensors. The hash table may include at least two hashed indexes created from edge subcomponent hashes using different keystores and the same cryptography. The plurality of inputs may further include location data, security information, time stamps, and/or connected tenant services. The smart communication system may further include a rules updating block connected to the fusion engine block where a mission has mission data and mission parameters, the mission parameters include an origin location for the mission data and a destination location for the mission data. The fusion engine block may operate according to a set of rules, may transmit data relevant to transmitting data between the origin location and the destination location to the rules updating block, and may generate updates for the set of rules based upon the mission parameters which are transmitted to the fusion engine. The mission data may include plural types of data with different characteristics, and the rules updating block may generate updates for the set of rules that include different rules for each of the plural data types. The different characteristics may include different security levels, and/or levels of importance. Mission importance may be one of the mission parameters, and the rules updating block may generate updates for the set of rules that set how much redundant data transmission is utilized.

BRIEF DESCRIPTION OF THE DRAWINGS

The invention will be described in detail with reference to the following drawings in which like reference numerals refer to like elements wherein:

FIG. 1. illustrates an architecture of military communication systems upon which the present invention may be implemented.

DETAILED DESCRIPTION

Current and future battlespaces are and will be defined by how quickly surroundings are sensed across every modality, how quickly those surroundings are analyzed, and how quickly high confidence maneuvering can be implemented.

Conventional warfighting equipment has focused on battlespace awareness and survival. Historically, this warfighting equipment has been platform specific and typically tied to intranet devices including weapons, sensors, and heads up/head down displays to enhance the survivability and lethality of warfighters in the context of conventional tactics. However, it is expected that conventional tactics must adapt to technology changes and the current military thinking is that warfighters and warfighting equipment will need to act more aggressively and in a more integrated manner. This new form of tactics is being called Distributed Lethality (DL) and it will utilize increased interoperability across current mission systems with new and emerging systems. While the military intends to move toward Distributed Lethality for its future warfighting, the military has not yet developed the hardware and software to implement Distributed Lethality. For example, the above intranet devices currently utilize a communication system that mirrors commercial communication systems which are ill-suited to modern battlefields, especially where Distributed Lethality (DL) is implemented.

The advance of precision munitions and sophisticated reconnaissance have made fixed placement warfare far less effective. As a result, maneuver warfare has become more important. For example, Ukrainian warfighters have been using maneuver warfare to devastating effect against Russia in their war.

Maneuver warfare is well suited to complement Distributed Lethality. Adaptive Force Packages (AFP) are essentially the personnel and their associated equipment that can be tailored to meet the specific needs of a given mission. An AFP will be most effective where there is a high confidence regarding target location and battlespace awareness where the AFP is able to perform high tempo actions. To achieve this, new communications interfaces are not needed, but a new form of data interoperability, correlation, fusion, and edge processing are needed which fuses logical and physical entities into a torrential stream of data that can enable highly distributed mission assured coherent communications tied to Software Defined Networking (SDN) across the battlespace and dynamically enable fluid re-composition of centers of gravity. Failure to do this will leave warfighters using ill-suited communication systems that reduce their combat effectiveness.

Successful maneuver warfare implementation requires high tempo operational cycles. Tempo is intrinsically tied to time, security and real-time fused awareness with inferential distributed processing of full-spectrum sensing linked to mission constraints for physical warriors, mission platforms, logical units and macro-warfighting functions. The current Department of Defense (DoD) implemented battlefield communications solutions focus on networking, transport, and physical interfaces tied to commercial telecommunications companies such as Starlink, Cisco and Juniper. The resultant battlefield communications platforms therefore mirror the structure and functionality of commercial communications systems. These commercial communication platforms provide Enterprise-to-Secure-Edge service (while the equivalent in DoD parlance is called National-to-Tactical) and are primarily focused on network and transport of electronic communications traffic. However, the military environment and priorities do not mirror the commercial environment and priorities which results in ill-suited communication systems.

Commercial communications systems have explored various routing metrics including minimizing delay, maximizing data delivery probability, maximizing path throughput, maximizing network throughput, minimizing energy consumption, and equally distributing traffic load. Irrespective of the routing metrics utilized in commercial communication systems, they operate in a synchronous manner. These commercial routing metrics are mirrored in current battlefield communication systems. However, the inventor of this patent application has discovered simply providing an internetworking data path to and from the edge as has been previously done is becoming less competitive as battlefields become increasingly connected and electronically contested. The battlefield communication systems for current and future battlefield will need to be smart communications systems able to inter-relate with diverse communication systems associated with every part of the battlefield in real-time through information fusion harmoniously intertwined with artificial intelligence such that a myriad of diverse users will be able to use what is on hand, connect with other users and sensors, and enable remote experts to operate forward systems through gateway nodes to support converged actions on an area of interest. To do this effectively, military communication systems will need to operate in both a synchronous and an asynchronous manner.

The inventive smart communication system as discussed above may be implemented on and interconnected with existing hardware. However, the optional Chip Scale Atomic Clocks (CSAC) 104 may be included in new hardware or retrofitted into existing hardware.

FIG. 1 illustrates an architecture of military communication systems 100 upon which the present invention may be implemented. The military communication system 100 has various component blocks including a stream processor 102, a Chip Scaled Atomic Clock (CSAC) 104, a Post Quantum Resistant (PQR) private distributed ledger 106, a fusion engine 108, an opposing force temporal analytics synchronicity 110, an allied force temporal analytic pull/push requests 112, a security-based anomaly detections 114, an entity hashing to manage indexes of sensors and users 116, an anomaly identifications 118, and a predictive artificial intelligence 120.

The stream processor 102 receives data streams from other gateways 122, physical users 124, logical sensors 126, and physical sensors 128. The other gateways 122 include other Local Area Network (LAN) to Wide Area Network (WAN) interconnected (or equivalent) systems operating in a peer-to-peer mesh. The physical users 124 include warfighters, commanders, analysts, and others. The logical sensors 126 include unattended cyber systems, expert system software, deterministic Machine Learning (ML) systems tied to edge processing needs, and Artificial Intelligence (A.I.) Deep Learning inference systems deployed to the edge. The physical sensors 128 include optical sensors on drones, aircraft, vehicles and other platforms, man-portable sensors, cameras, radar systems, radio wave monitoring equipment, and any other type of physical sensor. The data streams from other gateways 122, physical users 124, logical sensors 126, and physical sensors 128 advantageously are time stamped with a chip scaled atomic clock 104 using a myriad of high accuracy time stamp protocols such as Network Time Protocol (a networking protocol for clock synchronization between computer systems over packet-switched, variable-latency data networks), White Rabbit Protocol (White Rabbit is a collaborative project including CERN, GSI Helmholtz Centre for Heavy Ion Research and others to develop a fully deterministic Ethernet-based network for general purpose data transfer and sub-nanosecond accuracy time all of which is publicly available) and the like.

The various component blocks of the military communication system 100 at least partially implemented with non-transitory computer-readable medium such as random access memory, hard drives, or any other suitable non-transitory computer-readable medium able to implement the various component blocks.

Steam Processor: Stream processors 102 take action on data at the time the data is created. Historically, "real-time" processing by processors referenced where processors processed data as frequently as necessary for a particular use case. But with stream processors 102 and the abundant memory, "stream" processors are replacing "real-time" processors.

Stream processors 102 often perform multiple tasks on the incoming data streams from other gateways 122, physical users 124, logical sensors 126, and physical sensors 128. The processing may be performed serially and/or parallel, and may include generation of prepared data from the incoming data stream, the processing of the prepared data, and transmitting data to an intermediate or final destination.

Stream processors 102 may perform calculations, analytics (e.g., predicting a future event based on patterns in the data), transformations (e.g., changing a format of data), enrichment (e.g., combining data sources to create more context, meaning, or utility), and storage (e.g., placing data into databases). Stream processors 102 may also perform other actions.

Stream processors 102 connect diverse subcomponents together into a homogenous cluster supporting gateway system deployments and real time fused transactions across all subcategories. The stream processors 102 are configured to revolve around mission constraints and support real-time time sensitive targeting through declarative functions.

The stream processor 102 solves common data engineering tasks such as transformations, integrations, and multiplexing with declarative and unit testable configurations. This allows easy and incremental adaptation of data pipelines as requirements change, letting warfighters focus on fighting instead of dealing with equipment integrations.

The stream processor 102 is able to glue a wide range of sources and sinks together and hook into a variety of databases, caches, HTTP APIs, lambdas and more, enabling seamless integration onto existing data paths, but also present a way for new data such as inferential processing or Private A.I. to be deployed to increase system and its interfaced tenants warfighting effectiveness and survivability.

Delivery guarantees can be a dodgy in a contested battlefield. The stream processor 102 processes and acknowledges messages using an in-process transaction model with no need for any disk persisted state, so when connecting to at-least-once sources and sinks it's able to guarantee at-least-once delivery even in the event of crashes, disk corruption, or other unexpected server faults. While such a configuration is less than ideal in a commercial setting, on the battlefield it can be the difference between life and death.

The stream processor 102 is designed to be extremely durable, consistently working in all conditions and cloud scalable so when connected the stream processor 102 becomes part of provisioning tactical cloud data to platforms hosted on and tenant systems interfaced with a larger connected intranet or internet (on either public or private IP space). But when platforms are disconnected from the stream processor 102, the stream processor 102 continues to work reliably.

The stream processor 102 enables multi-platform interconnected coherent distributed awareness. Sensors inside a platform are correlated, transformed, and fused with sensors outside the platform through the stream processor 102.

The stream processor 102 provides "If This-Then This" functionality (I3T). I3T functionality checks incoming sensor data for anomalies. Exemplary anomalies include communication systems in the network that stop functioning, detection of a possible enemy weapons system by a vision based Neural Net that is hosted on common hardware the stream processor 102 is interfaced with based upon the stream processor 102 routing current and historical data. The stream processor 102 then automatically routes an alert to a user 116 on an integrated visual alerting systems or other system-of-systems to display and/or notify the warfighter. Optionally, other messages and/or commands may be sent out. For example, upon detection of a possible enemy weapon system, a drone could be automatically launched for investigation to validate a target over the horizon beyond the range of ground systems. Simultaneously, the stream processor 102 could take one or more of the following actions:

One or more alerts to warfighters or other systems to detect and identify (e.g., warnings to warfighters proximate to a possible enemy weapon system and tasking other sensors and/or other expert proxy systems to enhance the detection probability for the potential enemy weapon system).

One or more alerts to warfighters or other systems to target and possibly attack (e.g., automatically create a Digital Fires J/K-Series AFATDS/Link-16/Loitering Munition Message to target the potential enemy weapon system).

One or more alerts to warfighters or other systems to ready and/or activation of defense survival systems (e.g., automatically alert and/or activate Non-Kinetic/EMI Control &/or Kinetic for Chemical Biological Radiological and Nuclear (CBRN)/Missiles/Artillery/Kamikaze Drones risks).

Request for National Data/Publicly Available Data (PAI) tied to the area of interest to define geolocations and timing synchronicity of entities operating within the area of regard and then linking that new data to follow-on predictive actions of micro-services, applications, analytics, and algorithms hosted on platform.

Direct pull of updated Air-Ground-Space-Cyber picture into system inference engine supporting all warfighting domain converged Command and Control (C2) for Adaptive Force Packages (AFP) and Distributed Lethality (DL).

Direct push/pull/interconnect of system over host nation infrastructure via Managed Attribution Network (MaN) in a beacon to support tagging, tracking, and locating assets and entities of interest over a complex DL environments.

The invention utilizes existing networking Quality of Service (QOS) but acts as a master configuration manager that uses legacy devices focused on simply networking and transport QoS then overlays application, user, sensor, data fused awareness of what is occurring across gateway nodes to direct the Software Defined Network (SDN) through fused meshed awareness across the communication network in order to route, position, and/or pre-position the right information, to the right assets, at the right time, right place, and the right format. By doing this mission information is quickly provided to the physical and logical user in a format immediately ready for consumption and connectivity to sensor systems. This also may reduce the impact of opposing electronic countermeasures, may reduce reaction times for targeting or otherwise, may prevent or reduce the effectiveness of scouting of opposing forces, and may otherwise support improved mission aware processing. For example, the invention may predict an artillery unit will operate in a certain general area at certain times or alternatively the orders for the artillery unit may be used. A set of potential targets in that certain general area at that certain time is automatically compiled and sent to the artillery unit without a request over a burst asynchronous communication channel. Since no request is required unlike commercial systems, there is absent extraneous electronic signature to give away the exact position of the artillery unit. Additionally, the communication equipment with the artillery unit can use Global Positioning System (GPS) or Pseudo-Ranges from a (CSAC) or the like to determine its precise location and prioritize the received data, and the communication equipment could use this information to determine the danger level of two-way communication and make the determination as to whether the risk of two-way communication is worthwhile over available data paths. Such risk calculations are irrelevant in commercial systems but necessary as a matter of executing mission essential tasks for military systems.

Chip Scale Atomic Clock: Chip Scale Atomic Clocks (CSAC) 104 are used in military systems including dismounted Improvised Explosive Device (IED) jammers, dismounted radios, GPS receivers, and Unmanned Aerial Vehicles (UAVs). Chip Scale Atomic Clocks (CSAC) 104 provide high precision time stamps that supports anti-spoofing, anti-networking and routing efforts, aids in improving Content Data Networking (CDN) actions (e.g., co-location according to user—sensor needs) based upon time delays due to disconnected intermittent and latent communications. Chip scale atomic clocks 104 support multi-level security data movement tied to dynamic data movement (e.g., geo-location) to prevent ghosting of data across different classifications, domains, or otherwise. Advantageously, time delays are registered and instead of duplicate and/or stale data being rendered across the network, accurate timing tags allows smart communications systems to redact and remove redundant and/or stale data that would appear to be two separate data entities vs. the reality where those two stamps are the same but outside of time sync (termed ghosting of data).

Chip scale atomic clocks 104 are used to create coherent geolocation of hashed entities tied to "hidden users" either inside of data flows of tenant system or packet level awareness of all traffic on gateway system. Chip scale atomic clocks 104 are key to supporting accurate mobile data archival, federation, tagging, and data retrieval across distributed meshed gateway systems. Chip scale atomic clocks 104 support Radio Frequency (RF) front ends of decomposed edge Software Defined Radios (SDR) and sensor systems that utilize synchronized complex data exchanges over time (e.g., Orthogonal Frequency Division Multiplexing (OFDM) cellular 4G/5G networks linked to carrier aggregation and beam-forming technologies). Chip scale atomic clocks 104 aid in identifying opposition cyber targeting actions tied to distributed attacks on gateway systems (e.g., massive denial of services tied to synchronized actions on common interfaces, ports and protocols). Chip scale atomic clocks 104 aid in improving traffic flow of when things are pushed or pulled to edge nodes which have very limited bandwidth (e.g., sending non-mission critical information such as streaming full motion video, out-of-date information, an routine software updates or the like over a constrained link during combat would be considered something that degrades traffic flow during peak demand times while prioritizing enemy movement information proximate to the edge node would be considered an improvement to traffic flow tied to a mission essential tasking need and essential elements of battlespace information.

A chip scale atomic clock, or alternatively any other highly accurate local timing source, that can be used to tag, optimize federation/meshing, support cross domain multi-level security classification movement to prevent ghosting of data objects across distributed areas of the battlespace, and counter adversarial adjustments tied to spoofing and time attacks.

POR Private Distribution Ledger: Post Quantum Resistant (PQR) cryptography that is commercially available or alternatively one that is custom. PQR cryptography provides enhanced security as compared to typical commercial cryptography. PQR cryptography forces an opposing force to invest more computational power and more time to break the encryption. This allows the communication network a greater opportunity to define optimization and processing across its various system components and communication channels driving increased tempo and synchronicity of effects across operations.

A Private Distributed Ledger 106 tied to PQR cryptography functionally watermarks every data packet and session in the network and provides a form of authentication that registers the enormous inflow of user/sensor requests for sending and receiving data, validating each request internally within the communication network. Thus, a PQR Private Distribution Ledger 106 advantageously provides a more secure ledger, aids in anomaly detection (especially opposition cyber related activities such as hacking), and the veracity of mission intent based predictive analytics.

When a PQR Private Distributed Ledger 106 is coupled with a CSAC, the two synergistically work to further enhance authentications and access controls further improve predictive analytics.

Fusion Engine: Fusion engines 108 take the myriad of data collected with sensors or other sources and combines the data into a holistic picture that can be provided to physical and logical warfighting entities operating across a distributed battlespace. For example, the F-35 includes a fusion engine.

Opposing Force Temporal Analytics Synchronicity: Opposing force temporal analytics synchronicity 110 is also called opposition force analytics or red force analytics. These analytics are directly intertwined with the stream processor 102 and sub-systems to pull metadata fields from tenant systems data flows, attempts at network intrusion, methods of attempted intrusion, targeted areas of interest on the friendly force logical network by an enemy, sensor triggers and cues from friendly force sensors; as well as, hashed indexing of what friendly forces are doing and their needs to map out possible intents of enemy forces and the constant recompositing of enemy centers of gravity.

Allied Force Analytic Push/Pull Requests: Allied force analytics push/pull requests 112 also known as allied force analytics mirrors the function of opposition force analytics but expands upon predictive analytics by being able to see empirical needs tied to traffic pattens and map those to hashed tenant systems, users, and sensors; as well as, "n" number of systems that are meshed or connected to those tenant systems. Allied force analytics are deeply intertwined with predictive networking mapped to content delivery optimization and expanded battlespace aware QoS.

Command and Control (C2) networks provide rich data sets that are currently untapped. The present invention takes those rich data sets and mines them using big data analytic engines and/or artificially intelligent agents. The result of the mining is unforeseen insight into the modern battlespace which can be used by commanders to gain an advantage on the battlefield. Thus, the present invention provides an on-target rapid fielding of tactically relevant big data analytics capability to warfighters at the command level down to the dismounted level. This advantageously provides a fully functional analytics engine to support warfighters of every kind on the battlefield (both physical and logical extensions of warfighting functions). Additionally, this may be used to support follow-on or concurrent artificial intelligence efforts being employed across every level of warfare.

The present invention also can capture and utilize untapped data from organic tactical networks so as to enhance a new form of big data analytics which is meshed at the edge but connected across operational and tactical situations. Utilizing the pre-existing data that already moves in and out of the switching and routing of the communications squadrons/battalions and communications regiments while on its way out to the Joint Information Environment (JIE) allows information collection about the systems to parasitically be shared across the connected network. Exemplary types of data that can be moved include specific digital fires messages in traffic headers; as well as, health and status of distributed nodes.

The present invention also can capture and utilize untapped data from the Internet of Things (IOT) (IoT is the interconnection via the internet of computing devices embedded in everyday objects, enabling them to send and receive data including ambient environmental sensor data not just device specific data tied to health and status). Warfighters can utilize pre-existing platforms and networks to augment data collection on the battlefield. The number of useful pre-existing platforms and networks is only expected to grow with time. These sensors will be connected via a myriad of mediums, and report information back to a processing node that makes bins for its queries and outputs. For example, personal cell phones have extensive data including location trackers, microphones, software defined radios, passive radio frequency sensors, bio-metric measurement tools, and optical sensors connected via a high-speed, high-capacity backbone. Cell phone companies use the data collected from all of these apertures to understand users, their habits, likes, and dislikes, The same can be done with aircraft, ground sensors, weapons systems albeit for different purposes. Implementation like other elements of the Smart Military Communications will vary accordingly to support Military constraints. Additionally, non-military systems and sensors can be used to improve the understanding of the battlespace for warfighters by creating detailed environmental awareness across a plurality of sensor systems then feeding categorized updates to platform systems through this invention.

Two key things that will define success on current and future battlefields are relevant timely data and context aware mapping of the data to users (both logical and physical) and platform needs. By using data analytics, warfighters can acquire the ability to determine where they fall in the Observe, Orient, Decide, and Act (OODA) loop. This gives warfighters the opportunity to change tactics and/or not undertake certain actions with likely poor outcomes.

Additionally, the present invention allows a subtle change to the traditional OODA loop process that focuses on sequenced understanding of the battlespace to assist humans in responding appropriately to risk and opportunity by changing the cycle to be Sense/Act—Make Sense and Act. Where the plurality of subcomponents enables real-time automated environmentally aware orchestrated actions and intelligent Quality of Service (QoS) data meshing across nodes to make sense and share that macro awareness across the battlespace of warfighter and sensor systems.

Link-16, is a military Tactical Data Link (TDL) network used by North American Treaty Organization (NATO) and Bi-Lateral Alliances with the United States that is rich with high fidelity information which provides time, location, aspect, fuel status, weapons status, equipment status, and other information. To date, this granular link data has not been tapped into at either the tactical or operational levels. For example, commanders could have automated feeds providing them with the overall weapons loadout of an Integrated Air Defense System (IADS) or the weapons loadout of airborne combat air patrols. The commanders could see in real time the number of bombs hanging on the racks of airborne Deep Air Support (DAS), Suppression of Enemy Air Defenses (SEAD) and/or Close Air Support (CAS) missions. Other useful information could also be utilized such as the total fuel available for current airborne assets, or the status of ground radar systems.

Having ready access to this kind of data can have far reaching impacts on planning and the decisions that are made. Currently, aircraft loadouts are manually determined by either a voice check or by looking at track data on a scope (which is time consuming). The present invention uses a data analytics engine to perform a one-to-many query and then provide the data for use by all. For example, an air-to-air engagement takes place resulting in a number of reactions within the Marine Air Command and Control System (MACCS) of the United States Marine Corps. The Senior Watch Officer at the Tactical Air Command Center (TACC) wants to know the loadout and fuel of aircraft left on station. This is followed up by a query from the Air Defense Coordinator (ADC) to the Senior Weapons Director, who then asks the Air Intercept Controller to query the aircraft for status. This takes time and can be prone to mistakes, especially during high intensity and high tempo operations. With the present invention, an analytics engine could provide this information faster and with a higher confidence by mining the relevant data out of Link-16 and displaying the relevant data to those who need it instantly and with less human error.

Security Based Anomaly Detections: Security based anomaly detections 114 are the identification of important and rare occurrences, items, or events of concern due to their differing characteristics from the majority of the processed data. Such security-based anomaly detections 114 systems are common in cybersecurity and are limited to recognizing anomalies that deviate from an expected norm (a baseline established by human operators and deterministic software systems).

Entity Hashing Managing Sensors & Users:

Hashing is one of the most fundamental operations in data management. Hashing allows fast retrieval of data items using a small amount of memory. Hashing is also a fundamental algorithmic operation with rigorously understood theoretical properties. Virtually all advanced programming languages provide libraries for adding and retrieving items from a hash table.

More recently, hashing has emerged as a powerful tool for data similarity searching. Here the objective is not exact retrieval but rather the fast detection of objects similar to each other. For example, different images of the same item should have similar hash codes, for different notions of similarity, and we should be able to search fast for such similar hash codes.

Hash functions come in a variety of types. One such type is data-specific hash functions. Unlike the traditional algorithmic approach to hashing, where the hash functions are universal and do not depend on the underlying data distribution. The present invention uses data-specific hash functions to expand indexing of data streams tied to the stream processor 102 and sub-component elements within the block 100.

At its core, indexing is about making things easier to find and retrieve. Examples of indexing methods include a well-organized filing cabinet, encyclopedias, and even labeled aisles in a grocery store. Anytime we have lots of things where there is a need to find or identify a specific thing, an index makes finding that thing easier. With the present invention, hashing is used as an organized index of digital information that may reside on any number of digital devices at one or more locations. The hashing function does not require a person to decide how to classify the data, therefore allowing for an automated process to be mapped to I3T and invention sub-components.

To understand how Machine Learning and Artificial Intelligence can be used to recreate the critical features of a hash table (and other indexes), it is worth quickly revisiting the main idea of statistical modeling. A model, in statistics, is a function that accepts some vector as input and returns either: a label (for classification) or a numerical value (for regression). The input vector contains all the relevant information about a data-point, and the label/numerical output is the model's prediction.

In a model that predicts if a high school student will get into Harvard, the vector might contain a student's GPA, SAT Score, number of extra-curricular clubs to which that student belongs, and other values associated with their academic achievement; the label would be true/false (for will get into/won't get into Harvard).

In a model that predicts mortgage default rates, the input vector might contain values for credit score, number of credit card accounts, frequency of late payments, yearly income, and other values associated with the financial situation of people applying for a mortgage; the model might return a number between 0 and 1, representing the likelihood of default.

Typically, machine learning is used to create a statistical model by combining a large dataset with a machine learning algorithm. Running the algorithm on the dataset produces a trained model. Such algorithms automatically build accurate models from raw data without the need for the humans to help the machine "understand" what the data actually represents. This is different from other forms of analytics or artificial intelligence where humans examine the data extensively, give the computer clues about what the data means (e.g. by defining context aware domain specific relevancy to a user's input), and define how the computer will use that data (e.g. using minimax (minimax is a decision rule used in artificial intelligence, decision theory, game theory, statistics, and philosophy for minimizing the possible loss for a worst case scenario.) or A* (A* is a graph traversal and path search algorithm, which is used in many fields of computer science due to its completeness, optimality, and optimal efficiency). In practice, though, machine learning is frequently combined with classical non-learning techniques; an A.I. agent will frequently use both learning and non-learning tactics to achieve its goals. This invention mirrors that application by applying deterministic and intelligent data hash indexing to other forms of analytics and artificial intelligence support real time operations.

Part of entity hashing is linked to non-traditional algorithmic approach tied to machine learning to find data similar, understand its location, and map common elements of sensors, data streams, and users (physical and logical) needs into vectors pointing and directing the stream processor to be increasingly autonomous during its "If This Then This" (I3T) operations. Thus, hashing uses a function or algorithm to map object data to some representative integer value. This hash, which is also known as a hash code can then be used as a way to narrow down searches when looking for a particular item; as well as, map and predict needs of hidden users of tenant systems and data flows traversing the network via the stream processor 102. Generally, these hash codes are used to generate an index, at which the value is stored.

Because algorithms are repeatable, feeding an image, irrespective of whether that image is a jpeg image, a text document, a hard drive image, or any other format, into the algorithm, similar data will result in similar outputs. If the internal data changes, that output will also change. As such, the hashing index function is incredibly important for managing data balkanization across meshed assets distributed throughout the battlespace.

Exemplary hash functions include, but are not limited to the following:

CRC32: The cre32 algorithm is used to compute checksums. The two variants used in mhash are MHASH_CRC32 (the one used in ethernet) and MHASH_CRC32B (the one used in ZIP programs).

ADLER32: The adler32 algorithm is used to compute checksums. It is faster than CRC32 and it is considered to be as reliable as CRC32. This algorithm is defined as MHASH ADLER32.

MD5: The MD5 algorithm by Ron Rivest and RSA. In mhash this algorithm is defined asMHASH_MD5.

SHA1/SHA256/SHAS12: The SHA algorithm by US. NIST/NSA. This algorithm is specified for use in the NIST's Digital Signature Standard. In mhash these algorithms are defined as MHASH_SHA1, MHASH_SHA256, and MHASH_SHA512.

HAVAL: HAVAL is a one-way hashing algorithm with variable length of output.

HAVAL is a modification of MD5. Defined in mhash as MHASH_HAVAL256, MHASH_HAVAL192, MHASH_HAVAL160, and MHASH_HAVAL128.

RIPEMD160: RIPEMD-160 is a 160-bit cryptographic hash function, designed by Hans Dobbertin, Antoon Bosselaers, and Bart Preneel. It is intended to be used as a secure replacement for the 128-bit hash functions MD4, MD5, and RIPEMD. MD4 and MD5 were developed by Ron Rivest for RSA Data Security, while RIPEMD was developed in the framework of the EU project RIPE (RACE Integrity Primitives Evaluation, 1988-1992). In mhash this algorithm is defined as MHASH_RIPEMD160.

TIGER: Tiger is a fast hash function, by Eli Biham and Ross Anderson. Tiger was designed to be very fast on modern computers, and in particular on the state-of-the-art 64-bit computers, while it is still not slower than other suggested hash functions on 32-bit machines. In mhash this algorithm is defined as: MHASH_TIGER, MHASH_TIGER 160, and MHASH_TIGER 128.

GOST: GOST algorithm is a Russian standard and it uses the GOST encryption algorithm to produce a 256 bit hash value. This algorithm is specified for use in the Russian Digital Signature Standard. In mbash this algorithm is defined as MHASH GOST.

Linux encryption is typically opens sl, and includes but it not limited to the following: blake2b512, blake2s256, gost, md2, md4, md5, rmd160, shal, sha224, sha256, sha3-224, sha3-256, sha3-384, sha3-512, sha384, sha512, sha512-224, sha512-256, shake128, shake256, and sm3.

From a data science perspective, hashing is a wonderful tool to assist in cleaning data. For example, obtaining a clean data set of unique images can be a challenge depending on your sources in a large-scale image classifying project. Manual viewing and classification of the images is time consuming and futile in a battlefield environment where the useful lifespan of the images is often only a few minutes. However, hashing provides rapid classification and sorting of the images allowing predictive analytics to provide a warfighter with the data (e.g., images) needed in a timely manner tied to an automated targeting mission.

Hashes for present invention may advantageously incorporate (but not be limited to) the following data:

Device information,
Time Stamps of data streams traversing device,
Time Stamps from data streams from the device, Data Streams traversing the device, in combination, data format, and modality, Ambient Radio Frequency (RF) information, Tenant metrics for downstream devices (hop count, heartbeat, status etc.), Software firmware version, Last seen on the network detail (pulled from the distributed ledger often), Health and Status information for the network, Time of day that data is requested (which would feed into historical analytics), Type of crypto libraries available on tenant and gateway devices (which would feed into the Software Defined Intelligent Network), Availability of processing and storage for tenant systems traversing hash index location and for the gateway system hosting the hash index, and/or Security alerts triggered.

Anomaly Identification: Whereas each of the other main fields (e.g., Chip Scale Atomic Clocks 104 and PQR private distributed ledger 106) have subcomponent anomaly detections applicable for those specific modalities (time and distributed ledgers linked to authentication and access controls). This data flow is a flow down anomaly detection tied to data location, data flows, user and sensor needs linked to content data networking and the inferred anomaly tied to recognized, unrecognized, and future needs. It is an area that helps to define the QoS linked to a fused constraint tied to a user—sensor—and a desire.

Predictive Artificial Intelligence: Predictive Artificial Intelligence (AI or A.I.), also known as predictive analytics, historically has used accumulated data to predict future events (increasingly it uses A.I. and Deep Learning to infer needs based upon smaller sample sizes and optimized algorithmic fit). Typically, historical data is used to build a mathematical model that captures important trends. That predictive model is then used on current data to project what will happen next, or to suggest actions to take for optimal outcomes.

Based on prior history and outcomes, the predictive AI provides an insight into trends and patterns regarding allied forces using the communication system, the opposing forces interference with the communication system and its data sources (e.g., drones and sensor system), and other aspects. This assists in enhancing forces multipliers by mitigating risk (e.g., establishing communication channels that reduce the risk of lost data and/or opposing forces geolocating allied forces using the communication system), predict success (e.g., providing targets or targeting data that is most likely to result in a successful kill or warfighting affect such as destroy, disrupt, denying and degrading enemy centers of gravity), enhance delivery speed (e.g., prepositioning data or communication channels for faster data delivery) and security (e.g., setting up prearranged measures to counter expected electronic countermeasures from opposing forces). This is a result of capturing and analyzing historical and current data from communication systems.

An Artificial Intelligence Inference Engine is a component of the system that applies logical rules to the knowledge base to deduce new information. AI Inference Engines are a common commercial component. In this aspect of the invention, the AI Inference Engine builds hashes tied to users and sensors in order to create prescriptive analytics (prescribing network actions aligned with real time needs of missions—security and both typical/atypical anomaly detections) to predict data needs (such as co-location of data at optimized gateways ahead of user requests), meshing data flow (to define what nodes connect where and over what protocol and encryption according to the evolving threat and communications/networking Quality of Service (QOS)).

Currently QoS solutions tend to focus on throughput and quality of link across the following Key Performance Indicators (KPI). KPI is also known as metrics.

Metrics tied to Communications QoS include but are not limited to:

1. Uptime

Uptime, also known as availability, is a wireless network KPI that indicates the amount of time a wireless network is available for effective use. This is perhaps the most easily understood and straightforward KPI.

2. Network Jitter

Jitter measures a network's transfer rate consistency and indicates the variability in a delay time. Jitter is usually ignored because Transmission Control Protocol (TCP) connections are very tolerant of jitter and TCP connections handle the majority of network traffic. However, real-time applications like video and voice expect very low jitter. These applications' performances are significantly impacted when jitter is present. Additionally, wireless networks are much more prone to jitter than wired networks because of radio frequency and interference issues. Jitter up to 100 milliseconds is typically acceptable for general data while jitter above 20 milliseconds can cause major issues for real-time data.

3. Bandwidth and Throughput

Although bandwidth and throughput sound similar as wireless network efficiency KPIs, there is a subtle difference. Throughput measures the amount of data actually transferred from one point to another within a network path. Bandwidth is the amount of data that a network path is expected to bear, or that is expected to successfully transfer from one point to another in a network, within a set amount of time. Both bandwidth and throughput can be viewed in terms of Kbps, Mbps or Gbps and the differences between the two can be used to determine the performance of a wireless network.

4. Signal Strength

There are many factors that determine the Wi-Fi signal strength, such as desired data rates, number of clients on the network, background noise, and what applications will be used. For instance, a Voice over WiFi (VoWiFi) or Voice over Internet Protocol (VOIP) system may need a higher signal strength than a barcode scanner system in a warehouse. Typically, the greater the signal strength is, the better the wireless network throughput will be. Also keep in mind that wireless networks are often engineered such that the desired coverage area will always offer a signal strength above a predetermined minimum value (e.g., typically about −65 to −70 dBm).

5. Packet Loss

Packet loss is an indicator of congestion, low bandwidth, interference, etc., in both wireless and wired environments. Packet loss refers to a packet or packets of data transferred from one computer to another that fail to reach their destination. Packet loss is represented as a ratio of packets received at the destination over those sent by the source. This KPI can help measure the overall health of a wireless network, especially when focusing on the interaction between a specific AP and client. Acceptable packet loss benchmarks differ depending on the data type. For example, a packet loss up to 3% is typically acceptable for general data transfer but a packet loss rate of 1% to 2% is almost intolerable for a clear and understandable audio conversation with Voice over Wireless Local Area Network (VoWLAN).

6. Packet Re-Transmissions

When a data packet is sent out successfully but fails to reach its destination, the data packet needs to be retransmitted. Consequently, the wireless network experiences delays for the transmission in question, as well as a degradation to the overall throughput of the network. While retransmissions exist in all networks, they are much more common in wireless networks due to poor signal strength, hidden nodes, interference from other technologies, and adjacent channel interference.

7. Latency

Latency, also referred to as delay, is a measure of the time consumed in the transfer of data between two points in a network. Latency is generally used to monitor TCP and UDP. High latency is a key indicator of slow network connection and poor performance. The threshold depends upon the situation. For example, a high latency (e.g., up to 100 milliseconds) may be acceptable for general data while lower latencies (e.g., less than 50 milliseconds) are preferred for real-time applications.

Latency can be caused by a variety of factors. In the ideal case, latency is the time for data to travel from the sending device to the receiving device (for the ideal case latency equals the transmission delay). Unfortunately, interference or other wireless factors may prevent the data from reaching the receiving device and the data must be retransmitted. Depending on network utilization and other factors, retransmission may make latency much larger than the transmission delay. Another factor that can increase latency is routing or processing delay which is introduced whenever data is processed by a computer, router, or some other device. The routing or processing delay is not just the operating speed of the computer, router, or some other device, but may also be increased with increased data traffic. Finally, there may be intermediate devices other than the initial sending device and the final receiving device, each of which may increase the routing or processing delay.

IEEE 802.11 specifications have greatly reduced the overhead with roaming operations although roaming operations remains one of the most problematic operations on wireless networks and can adversely affect wireless connections and VoWLAN operating over Virtual Private Networks (VPNs).

As military organizations continue to become increasingly dependent on their wireless networks, maintaining performance continues to mirror the network and transport layer in the commercial sector. However, having military communication systems mirror commercial communication systems fails to recognize and thus fails to address the fact that military communication systems operate in a fundamentally different environment than commercial communication systems.

The smart communication system of the present invention links elements together to create a new metric for mission-assurance communications tied to real time edge processing and operations useful for next generation Software Defied Networking (SDN), referred herein as Software Defined Intelligent Networking (SDIN).

Furthermore, system components of commercial systems often communicate and identify users/components with hashes for use by related or interoperable system components. However, different systems often use different hashing and hash different data which means those system components that are not related or interoperable effectively do not communicate to each other because it is not technically nor financially feasible to try to force a homogenous hardware and custom software deployment which may dramatically change an edge systems role and how it performs with other edge systems. Edge systems often are heterogenous in nature for both their hardware and software, and are connected together either in a local mesh or to a core enterprise resource management systems. Edge systems at the extreme edge such as Internet of Things are size weight and power limited by design to support affordability and technically streamlining embedding them into other compatible systems. As such, the smart communication system of the present invention manages edge systems by locating gateway systems, such as a Stellar Relay system from Parry Labs, LLC at the nexus points of expanded processing, storage, real-time translation, and data indexing.

One constraint for tenant edge systems is that they are tied to a particular hash indexing. Often, these tenant edge systems use Linux systems with MD5 or SHA256 hashing which may be used for package downloading for software updates, firmware fixes, and the like.

The smart communication system of the present invention connects edge hashes based on the Linux constraints back to a PQR enterprise keystore. Specifically, an exemplary data flow looks like: Edge Hash Index→Plain Text sent to stream processor 102→stream processor 102 sends text to binary compression→stream processor 102 sends binary data to index for PQR Encryption Certification→stream processor 102 holds encrypted index until QoS identifies it is a good time to pass data to a senior hash node→Edge Node pushes encrypted compressed binary index data over a PQR tunnel to Enterprise Node→Enterprise Node uses its stream processor 102 to unpack and decrypt contents. The smart QoS system (which includes the Stream Processor) of the senior node system then reviews contents sent to the node and incorporates junior edge node information into its more expansive and processor enabled PQR keystore.

The smart communication system of the present invention employs these two cryptographic key stores at a hash index. The hashing for dissimilar data (such as downloading software updates) must be mirrored through use of a common keystore. As such a hash that starts with MD5 or SHA256 keystore must use it end to end.

Web 2.0 hashing with commercial communication systems is conducted at an enterprise location resulting in a consistent keystore that was never fragmented nor balkanized. However, military communication systems do result in fragmentation and/or balkanization as indexes are distributed and are created at the tactical edge.

With the application of meshed military communications systems using hashed indexes now we have a very unique data duplication issue and federation challenge. Furthermore, the size of our key store will in the future demand expanded cryptographic libraries that are not traditional to edge Linux systems or other systems.

As such, the smart communication system of the present invention will map hashed indexes at the edge to create meshed awareness across physical processors holding different keystores using the same cryptography.

Additionally, the smart communication system of the present invention will utilize expanded keystores implemented with PQR/PQC cryptography. These PQR keystores will allow expanded entities to be recorded between data flows and provide improved security against quantum computer attacks. Additionally, these expanded keystores will expand application of hash indexing tied to Content Data Networking (CDN) by having more capacity to enumerate more relationships.

So, the smart communication system of the present reconciles the different keystores through smart QoS and then maps edge hashing of user needs (physical and logical) to enterprise predictive analytics.

Advanced Field Artillery Tactical Data System: The Advanced Field Artillery Tactical Data System (AFATDS) provides fully automated support for planning, coordinating, controlling, and executing fires and effects such as mortars, field artillery cannons, rockets, missiles, close air support, attack aviation, and naval surface fire-support systems. AFATDS interoperates and integrates with more than 80 different battlefield systems, including Navy and Air Force command and control weapon systems.

AFATDS is the primary command and control system for Long-Range Precision Fires Cross-Functional Team initiatives, such as Extended Range Cannon Artillery, Extended Range Guided Multiple Launch Rocket System, Precision Strike Missile Program, and Projectile Tracking System.

AFATDS fuses the essential situational awareness data, intelligence information, and targeting data in near real-time to make effective targeting decisions that align with Mission Command guidance and priorities. It pairs targets to weapons to provide optimum use of fire-support assets and timely execution of fire missions.

AFATDS provides the Army, Navy, and Marine Corps with automated fire-support command, control, and communications. It is used to plan, execute, and deliver lethal and nonlethal effects. AFATDS also provides joint/coalition situational awareness for fires execution and mission management. AFATDS runs on laptop computers (e.g., ruggedized laptop computers) with Windows® software.

Quality of Service Policies Dynamically Updated on Stream Processor by Interrelated Analytics: A Quality of Service Policies Dynamically Updated on Stream Processor by Interrelated Analytics Tenants 130 may be connected to the stream processor 102. The "tenant blocks" (104, 106, 108, 110, 112, 114, 116, 118, and 120) to the right of the stream processor 102 of FIG. 1 traditionally have no relationship to each other. The stream processor 102 gains updated declarative rules from these tenants blocks and those rules result in a new form of QoS.

The stream processor 102 is declarative and operates in a constant state of "if this occurs do this". As such, the "rules" of the stream processor 102 for routing are based upon smart things plugged into stream processor 102 which update interrelate rules according to the smart thing's specialty area. In cases where there are conflicting rules where one device (such as a security gatekeeper) rejects the prioritization of another smart service plugged into the stream processor 102 (such as allied force temporal analytic pull/push requests 112), the arbitration agent is the smart service that is called "entity hashing for sensors and users" (entity hashing to manage indexes of sensors and users 116). This hashing component when connected is constantly being fed updated relationships between all sensors 126, 128 and physical users 124 local to the environment and then when communications are available is coordinating and synchronizing sensors and user data that feeds the other blocks with other meshes across the enterprise.

QOS metrics from those rules expand and fortify the relationship between routes, throughput allocated, ports/protocols accepted/used, ways that data is divided prior to being sent, multi-route paths data could be sent, security risks tied to a distributed index of concern across the mesh nodes, and unique identifiers tied to the nodes traffic which prioritize mission based events and inferred needs of the tenants (cyber and physical) using the military communication system 100.

The entity hashing (entity hashing to manage indexes of sensors and users 116) feeds into the fusion engine 108 which feeds into the stream processor 102. The stream processor's 102 unique identifier is a node ID, proceeding further down into tenant services (such as fusion engine 108 and entity hashing to manage indexes of sensors and users 116) unique identifiers become more and more expansive and detailed according to specific software function. The stream processor 102 talking to another node that has a stream processor 102 will see node IDs allowing macro level management of the relationship through the stream processors 102. For nodes that interrelate to other nodes that do not have some of the software features/unique identifiers (such as missing a fusion engine 108) then the identifier will default to the next higher level of the node ID. Highly provisioned enterprise gateways will always have the blocks noted in the data flow diagram. Modern software cloud native deployment strategies (such as Continuous Integration and Continuous Delivery aka CICD) will map deployment models of updated routes, algorithms, throughput, mission priorities and inferred user/sensor needs to the highest-level user ID that will distribute information according to sub-tenants plugged into it.

The aggregated services support Location Aware Dynamically updating QoS identifiers that the mesh manages as a living breathing topography which is polymorphic and adaptable according to user/sensor needs, mission, and gauged shaping of the environment. An important element for the Location Aware Dynamically updating QoS is separating metadata updates and distribution from content updates. The design of the Smart QoS mitigates nodes receiving too many updates and clogging up pipes by having smart throughput design where processing, storage, mission-based messages, and all of the tenant services aggregate to advertise via the fusion engine 108 then the stream processor 102 a unique message indicating availability to share information, if that data share is synchronous or asynchronous, timing for that share, and security considerations; such as port/protocol adjustment, or avoiding moving data to specific nodes that are under a high state of use or duress (such as being targeted by malicious action). Functionally, this is a flow control lever for physical users 124 and sensors 126, 128 tied to time, location and security.

Commercial communication systems do not function well as military communication systems because they fail to adapt to the adversarial environment on the battlefield. Instead, commercial communication systems used in battlefield environments continue to rely upon traffic, port and protocol rejection (this focus is termed perimeter security) irrespective of whether the environment is a commercial environment or a battlefield environment. This in turns results in a fallacy of thought that perimeter security is sufficient for all military communications needs and the network is both secure and operationally enabling (irrespective of complex security threats and insider risks). The approach of the military communication system of the present invention removes this assumption and applies tenants with computational complexity tied to mission needs, tenant data streams, organic processing and storage which constantly responds to external and internal cues is a more appropriate way for the battlefield environment so as to expand or improve communications as compared to what would otherwise occur with commercial communication systems used in a battlefield environment. The military communication system of the present invention accepts and flows around friction dynamically thereby shaping the threads connecting needs to nodes, processing, storage and routes.

Smart services plugged into a consistent and durable stream processor 102 hosting a node ID, which when working together as a plurality supports the ability to define what the system knowns, which other nodes need updates with that information, and a meshed awareness if particular nodes have been updated. For example, if multiple nodes of the same mesh see the same security anomaly at exactly the same time, validating that anomaly would occur but once because the validation would be added into a hash index that can be shared in total without repeating duplication of the validation and would also avoid the need for duplicate messages being sent throughout the military communication system 102. This advantageously provides a unique breadth of awareness not currently found in military communication systems in addition to the link quality but on the real time awareness what is happening inside that link, across all links, according to time of day, missions being executed, and adversarial action.

The military communication system 100 may be operated without connection to any other military communication systems 100 or may be connected to and operated with one or more other military communication systems 100. The various blocks or components of the military communication system 100 may include multiples of each.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

REFERENCE NUMERALS AND DESIGNATIONS

- 100 military communication system
- 102 stream processor
- 104 Chip Scaled Atomic Clock (CSAC)
- 106 Post Quantum Resistant (PQR) private distributed ledger
- 108 fusion engine
- 110 opposing force temporal analytics synchronicity
- 112 allied force temporal analytic pull/push requests
- 114 security-based anomaly detections
- 116 entity hashing to manage indexes of sensors and users
- 118 anomaly identifications
- 120 predictive artificial intelligence
- 122 other gateways
- 124 physical users
- 126 logical sensors
- 128 physical sensors
- 130 Quality of Service Policies Dynamically Updated on Stream Processor by Interrelated Analytics Tenants

What is claimed is:

1. A smart communication system comprising:
   a stream processor;
   a plurality of inputs that are time stamped with times from a chip scaled atomic clock; and
   a plurality of functional blocks implemented in non-transitory computer-readable mediums including:
   an encrypted private distributed ledger block,
   a fusion engine block,
   a hashing block, and
   a predictive analytics block,
   wherein the plurality of inputs are hashed by the hashing block to produce hashed inputs and the hashed inputs are posted into the encrypted private distributed ledger block as a hash table,
   wherein the predictive analytics block processes the hash table based upon a predetermined criteria for a particular user or based upon a predictive analytics determined criteria of the particular user to produce a data subset for the particular user, and
   wherein the fusion engine block organizes the data subset for the particular user into an organized data subset.

2. The smart communication system of claim 1, wherein the predetermined criteria for the particular user is derived from mission parameters.

3. The smart communication system of claim 1, wherein the predictive analytics determined criteria of the particular user is derived from historical usage of the particular user.

4. The smart communication system of claim 1, wherein the fusion engine block organizes the data subset for the particular user by excluding redundant or stale data.

5. The smart communication system of claim 1, wherein the fusion engine block organizes the data subset for the particular user by prioritizing data based upon the predetermined criteria for the particular user or based upon the predictive analytics determined criteria of the particular user.

6. The smart communication system of claim 1, wherein the fusion engine block locates the organized data subset in a communication network based upon the predetermined criteria for the particular user or based upon the predictive analytics determined criteria of the particular user such that a delivery time is minimized for the particular user when the organized data subset is requested by the particular user.

7. The smart communication system of claim 1, wherein the fusion engine block locates the organized data subset on a system used by the particular user without a request from the particular user.

8. The smart communication system of claim 1, wherein the encrypted private distributed ledger block is a post quantum resistant encrypted private distributed ledger block.

9. The smart communication system of claim 1, wherein the plurality of functional blocks implemented in non-transitory computer-readable mediums further includes one or more of:
   an opposing force temporal analytics synchronicity block,
   an allied force temporal analytic pull/push requests block,
   a security based anomaly detections block, or
   an anomaly identifications block.

10. The smart communication system of claim 1, wherein the plurality of inputs are from one or more of users, logical sensors, other communication systems, and physical sensors.

11. The smart communication system of claim 1, wherein the hash table includes at least two hashed indexes created from edge subcomponent hashes using different keystores and the same cryptography.

12. The smart communication system of claim 1, wherein the plurality of inputs further includes location data.

13. The smart communication system of claim 1, wherein the plurality of inputs further includes security information.

14. The smart communication system of claim 1, wherein the plurality of inputs further includes time stamps.

15. The smart communication system of claim 1, wherein the plurality of inputs further includes connected tenant services.

16. The smart communication system of claim 1, further comprising a rules updating block connected to the fusion engine block, wherein a mission has mission data and mission parameters, the mission parameters include an origin location for the mission data and a destination location for the mission data, wherein the fusion engine block operates according to a set of rules, wherein the fusion engine block transmits data relevant to transmitting data between the origin location and the destination location to the rules updating block, and wherein the rules updating block generates updates for the set of rules based upon the mission parameters which are transmitted to the fusion engine.

17. The smart communication system of claim 16, wherein the mission data includes plural types of data with different characteristics, and wherein the rules updating block generates updates for the set of rules that include different rules for each of the plural data types.

18. The smart communication system of claim 16, wherein the different characteristics include different security levels.

19. The smart communication system of claim 16, wherein the different characteristics include levels of importance.

20. The smart communication system of claim 16, wherein mission importance is one of the mission parameters, and wherein the rules updating block generates updates for the set of rules that set how much redundant data transmission is utilized.

\* \* \* \* \*